Oct. 11, 1966  F. W. GUTZWILLER  3,278,821
CEMF RESPONSIVE CONTROLLED RECTIFIER SUPPLY FOR MOTORS
Filed Oct. 14, 1963  3 Sheets-Sheet 1

INVENTOR.
Frank W. Gutzwiller,
BY Henry J. Morunick
Attorney.

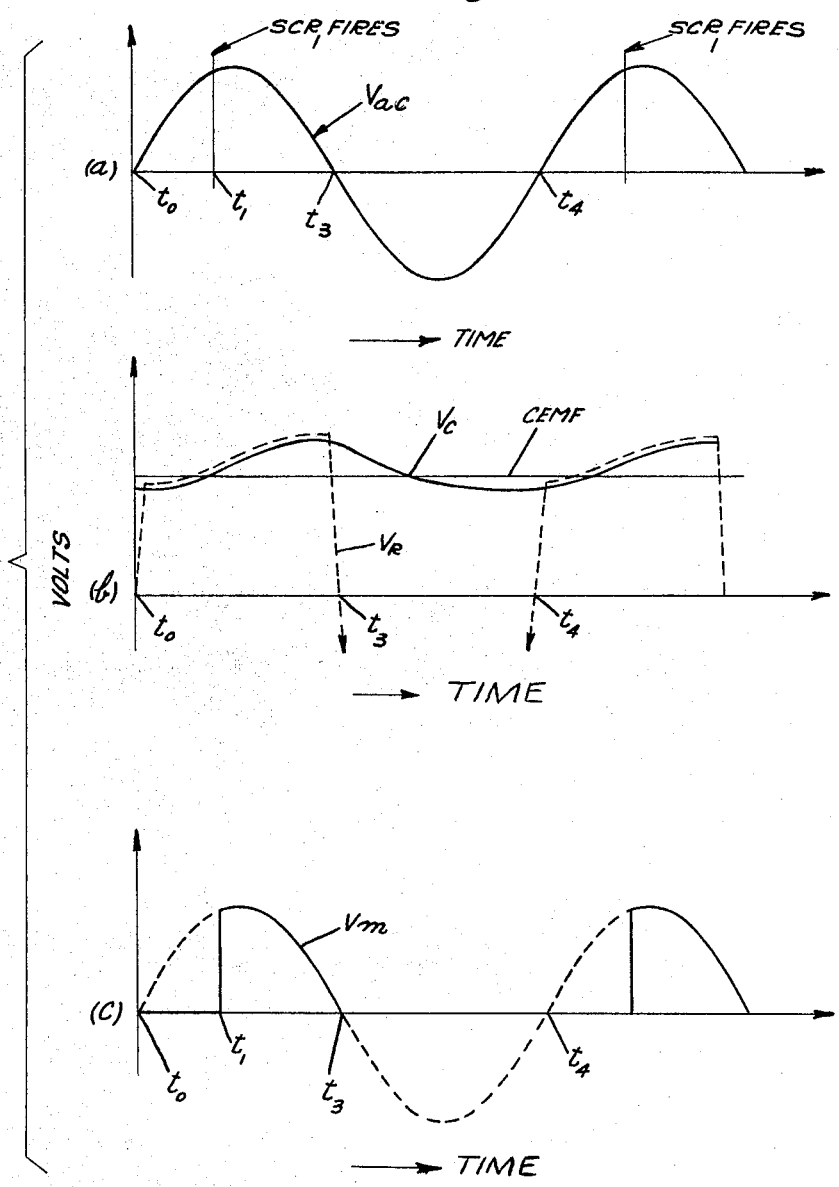

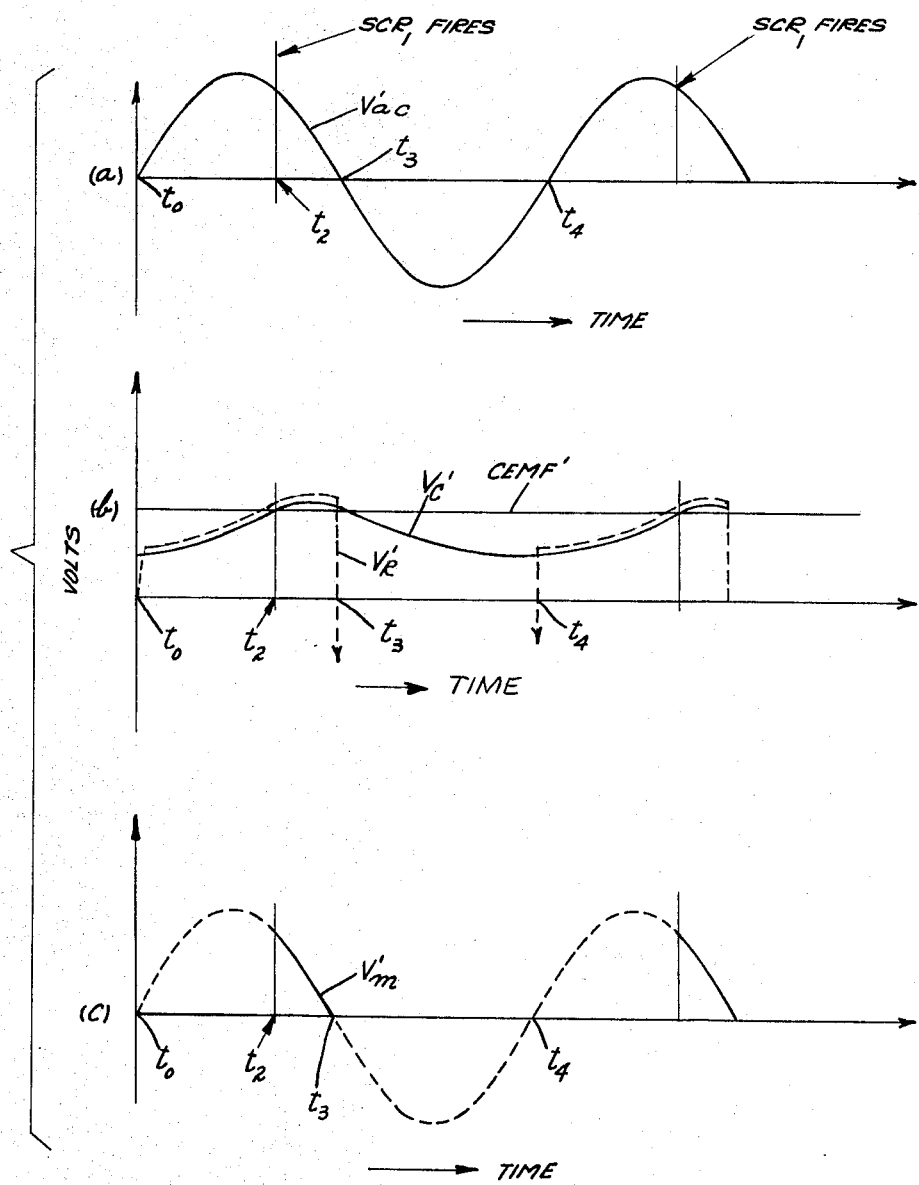

3,278,821
CEMF RESPONSIVE CONTROLLED RECTIFIER
SUPPLY FOR MOTORS
Frank W. Gutzwiller, Auburn, N.Y., assignor to General
Electric Company, a corporation of New York
Filed Oct. 14, 1963, Ser. No. 315,982
5 Claims. (Cl. 318—331)

This invention relates to control circuits, and more particularly to such circuits for controlling the speed of motors wherein the counterelectromotive force induced by the motor residual field is utilized as a speed feedback signal for the control and regulation of the motor speed.

Speed control circuits utilizing the motor counterelectromotive force resulting from the residual motor field as a control parameter have been proposed in the past. The counterelectromotive force is particularly suitable control parameter since its magnitude is usually proportional to the motor speed. When the motor armature is standing still, no voltage is induced in the armature by the residual field. As the motor speeds up, its residual induced voltage increases proportionally with the speed. In such control circuits, the phase angle at which a controlled rectifier is fired depends on the point in each half cycle or alternate half cycle of the alternating power supply when the instantaneous value of the reference voltage signal exceeds the counterelectromotive force while the control lead of the rectifier is positive with respect to the cathode lead. Since the counterelectromotive force is proportional to the speed, the phase angle will vary with the speed to increase or decrease the power supplied thereby to maintain the speed at a selected level, and the control circuit therefore is inherently regulating.

In one such control circuit of the prior art a controlled rectifier is connected between the field windings and the armature of the motor to phase control the power supplied to the motor. The firing signal for the controlled rectifier is obtained by comparing the counterelectromotive force of the motor presented at the cathode lead of the controlled rectifier with an attenuated sine wave, which is in phase with the supply voltage. The reference sine wave is obtained from a potentiometer connected across the supply terminals for the control circuit and is applied at the control lead or gate of the controlled rectifier.

A disadvantage of such a conventional arrangement is that the range of speed control is limited since the controlled rectifier cannot be fired beyond a 90-degree angle. Also at low speed settings this type of control has a tendency to hunt as it alternately conducts for a few cycles and then blocks for a few cycles.

In many motor applications it is desirable, if not necessary, that the speed control circuit effectively control the motor speed over a wide range of speeds. Further, when the control circuit is set to provide a selected motor speed, it is desirable that this speed be maintained substantially constant with varying torque requirements.

In my copending application Serial No. 181,497, filed on Mar. 23, 1962, for control systems, one type of motor speed control circuit described and claimed therein utilizes an essentially flat-topped voltage signal in phase with the supply voltage as a reference. This signal is compared with the residual induced voltage of the motor. Although such control circuits make it possible to achieve improvements in the range of speed control as compared with control circuits utilizing an in phase sine wave as a reference level, further improvements in the range of speed control and stability of operation at low speeds are desirable.

Accordingly, it is a general object of the present invention to provide an improved circuit for controlling and regulating the speed of a motor.

Another object of the invention is to provide an improved speed control circuit that provides for stable control at low motor speeds.

It is a more specific object of the present invention to provide a speed control circuit employing relatively few parts and having a feedback loop with relatively more gain at all speeds.

In accordance with one form of my invention I have provided an improved circuit for controlling the speed of an electric motor in which a reference signal consisting essentially of a cosinusoidal voltage superimposed on a D.C. signal is compared with the counterelectromotive force resulting from the residual motor field to provide a firing signal for a solid state switching device. Preferably, the switching device is a silicon controlled rectifier. To produce this reference signal I employ a voltage dividing network which includes a variable resistance element with an adjustable arm or tap, and an integrating capacitor connected in circuit with the tap across the variable resistance element.

The solid state switching device is connected in series circuit with a pair of control terminals at which the counterelectromotive force is presented. Further, the serially connected control terminals and switching device are connected across a pair of input terminals provided for connection to an alternating source. As a result of the integrating action of the capacitor and its connection to the tap of the variable resistance element, a reference signal having an essentially cosinusoidal wave superimposed on a D.C. signal is provided. When the reference signal overcomes the counterelectromotive force, the current required to trigger the switching device is supplied thereto, and the switching device conducts current to the motor. In other words, a firing signal is provided that is essentially equal to the difference between the reference voltage signal and the counterelectromotive force.

In a preferred form of my invention, a first rectifying element is connected in series circuit with the variable resistance element and a second rectifying element is connected in circuit with the capacitor and the switching device to isolate the reference signal circuit from the switching device in alternate half cycles.

According to more specific aspects of the invention, I have provided a transistor amplifier stage between the gate element of the switching device and the voltage reference signal network. With such an arrangement more current gain is provided for the reference signal and further improvements may be achieved in the range of speeds controlled.

Further aspects of the invention will become apparent from the more detailed description of the invention which follows. It will be understood that the specification concludes with claims which particularly point out and distinctly claim the subject matter which I regard as my invention. The invention however, both as to organization and method of operation, together with further objects and advantages thereof, may be best understood by reference to the following description taken in conjunction with the accompanying drawings in which:

FIGURE 2 illustrates a series of waveforms used to explain the operation of the control circuit of FIGURE 1 for a high speed setting, time being plotted along the abscissa axis and voltage along the ordinate axis.

FIGURE 3 illustrates another series of voltage waveforms corresponding to a low speed setting of the control circuit of FIGURE 1.

Figure 1:
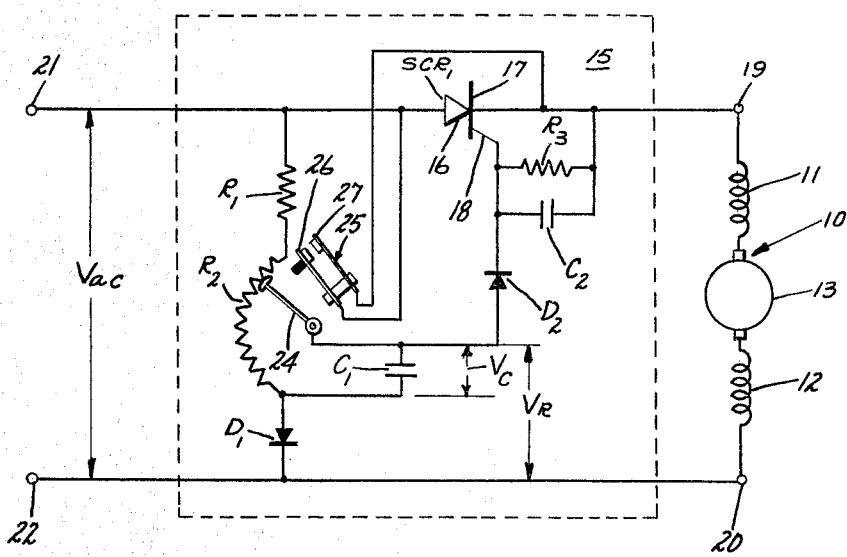
FIGURE 1 is a schematic circuit diagram of one embodiment of my invention.

Referring now more particularly to the drawings, I have shown one form of the invention as applied to the control of a series or universal motor 10. The motor 10 is shown diagrammatically by its series connected field winding 11, 12 and armature 13. A solid state switching device $SCR_1$, preferably a silicon controlled rectifier, is connected in series with the motor 10. The control circuit is shown enclosed in a dashed rectangle and is generally identified by reference numeral 15.

Silicon controlled rectifiers are particularly suitable switching devices since they can be switched from a blocking to a conducting state in a matter of microseconds and can therefore control the power supplied to the motor 10 in each half cycle or alternate half cycle. The controlled rectifier $SCR_1$ used in the exemplification of the invention is a well-known PNPN junction semiconductor device and includes an anode 16, a cathode 17, and a control element or gate 18. The operation of the type of controlled rectifier used in the illustrated exemplification is more fully described in chapter 1 of the General Electric Controlled Rectifier Manual, first edition, 1960.

It will be understood that according to convention, the controlled rectifier $SCR_1$ passes current only in the direction indicated by the arrow which forms a part of the symbol used to diagrammatically represent the controlled rectifier $SCR_1$. The controlled rectifier $SCR_1$ can be switched to a conducting state at an anode-to-cathode voltage less than the breakover voltage of the controlled rectifier by supplying a low level gate-to-cathode signal. This characteristic makes it possible to use the controlled rectifier $SCR_1$ to control a substantially large current flow by a relatively small signal applied at the control element 18.

The motor 10 is connected across the control terminals 19 and 20. Controlled rectifier $SCR_1$ and the motor 10 are connected in series circuit across a pair of input terminals 21, 22 provided for connection to a suitable alternating current source such as a 120-volt, 60-cycle supply. As employed in the control circuit configuration illustrated in FIGURE 1, the controlled rectifier $SCR_1$ exercises phase control of the power supplied to the motor during each alternate half cycle. More specifically, the controlled rectifier $SCR_1$ is rendered conductive only in the half cycle during which the voltage applied at the anode 16 is positive with respect to the voltage at the cathode 17. In other words, the controlled rectifier $SCR_1$ can be switched into conduction when the voltage applied at input terminal 21 is positive with respect to the voltage at input terminal 22. For convenience, this half cycle will hereinafter be referred to as the positive half cycle.

In order to fire the controlled rectifier $SCR_1$, a reference signal applied at the gate element 18 of the controlled rectifier $SCR_1$ is compared with the motor counterelectromotive force presented at the control terminal 19. The reference signal is supplied by a network which includes a fixed resistance element or resistor $R_1$ and a variable resistance element or potentiometer $R_2$, a pair of diodes $D_1$, $D_2$ and an integrating capacitor $C_1$. A capacitor $C_2$ and a resistor $R_3$ connected across the gate 18 and cathode 17 of the controlled rectifier $SCR_1$ are provided in order to improve circuit stability and prevent misfiring of the controlled rectifier $SCR_1$.

The diodes $D_1$ and $D_2$ isolate the capacitor $C_1$ from the controlled rectifier $SCR_1$ during each negative half cycle of the alternating supply. Diode $D_2$ also serves to protect the gate of the controlled rectifier $SCR_1$ from excessive reverse voltages when the controlled rectifier $SCR_1$ is triggered into conduction.

The resistor $R_1$ and potentiometer $R_2$ function as a voltage divider, and the sliding tap or arm 24 serves as the control element of the speed control circuit 15. An adjustment of the arm 24 changes magnitude of the resistance in parallel with the capacitor $C_1$ and controls the base D.C. voltage level or pedestal of the reference signal. It will be noted that the arm 24 of the potentiometer $R_2$ is connected with a shunt switch 25 having a movable contact 26 and a fixed contact 27 connected in shunt across the controlled rectifier $SCR_1$. When the arm 24 is moved in a clockwise direction as seen in FIGURE 1 to the maximum speed position, the arm 24 will cause the movable contact 26 to engage the contact 27 thereby closing the shunt switch 25. In this mode of operation the motor 10 is energized by both half cycles of the alternating source and will therefore operate at full speed. When arm 24 is rotated away from the high speed position out of engagement with the switch 25, the switch 25 remains open, and controlled rectifier $SCR_1$ controls the power supplied to the motor 10.

Having reference now to the voltage waveforms shown plotted along the same time axes in FIGURES 2 and 3 respectively, the operation of the control circuit 15 will now be more fully explained. The simplest mode of operation of the control circuit 15 occurs when the arm 24 of the potentiometer $R_2$ is in the maximum or full speed position. When the potentiometer $R_2$ is in this position, the fullwave supply voltage $V_{ac}$, as shown in FIGURE 2a, is applied across the motor 10 since the controlled rectifier $SCR_1$ is shunted by the closed switch 25.

For speeds below full speed, the shunting switch 25 remains open. When the arm 24 is rotated in a counterclockwise direction, the speed of the motor 10 is progressively reduced. For all positions of the potentiometer $R_2$ with the exception of the full speed position, it will be appreciated that the shunting switch 25 is open, and power supplied to motor 10 is phase controlled by the controlled rectifier $SCR_1$.

Like any other rectifier, the silicon controlled rectifier $SCR_1$ is capable of passing current only on one half of the applied alternating supply. The power supplied to the motor 10 in each positive half cycle is controlled by the conduction period of the controlled rectifier $SCR_1$. The firing angle of the controlled rectifier $SCR_1$ is determined by comparing a reference voltage signal $V_R$ with the counterelectromotive force of the motor 10 resulting from the residual field.

In FIGURES 2b and 3b I have illustrated the voltage waveforms $V_c$, $V_R$ and $V'_c$, $V'_R$ for a high and low speed setting of the control circuit 15, respectively. It will be noted that the waveforms of the reference voltages $V_R$, $V'_R$ are not shown for the entire negative half cycle. During the negative half cycle the reference voltage essentially has the waveform of the negative half cycle of the line voltage. Thus, the reference voltage in the negative half cycle may reach a peak value of approximately 170 volts as compared to a 1–10 volt magnitude during the positive half cycle, and cannot be conveniently drawn to the same scale. During the positive half cycle, the reference signal voltages $V_R$ and $V'_R$ are essentially cosine waves superimposed on a base D.C. signal level conventionally referred to as the pedestal, that is adjustably controlled by the potentiometer $R_2$. The cosine waveshape of the ramp of the reference signal, i.e., the wave added to the pedestal, results from the integrating action of the capacitor $C_1$.

If we assume that the line voltages $V_{ac}$ and $V'_{ac}$ are essentially sinusoidal, as shown in FIGURES 2a and 3a, the voltage applied across the potentiometer $R_2$ will also be a sinusoidal voltage of lesser amplitude due to the voltage divider action. The capacitor $C_1$ displaces this sinusoidal voltage by ninety electrical degrees to provide a cosine wave during the postive half cycle during which the capacitor $C_1$ is charged. It will be seen from the voltage waveforms $V_c$ and $V'_c$ that this cosine wave is displaced above the zero voltage reference level by the amount of the charge remaining on the capacitor $C_1$ at the end of the previous negative half cycle, this displacement comprising the pedestal. As is shown in FIGURES 2b and 3b, the voltages $V_c$ and $V'_c$ across the capacitor $C_1$ have essentially an exponential waveform during the negative half cycle when the capacitor $C_1$ discharges. Thus, the voltage waveforms $V_c$ and $V'_c$ consist essentially of segments of a wave that is alternately cosinusoidal in shape during the time interval $t_0$–$t_3$ and exponential in shape during the interval $t_3$–$t_4$ of each cycle of the alternating line voltage. In accordance with the invention the cosinusoidal segments form a part of the reference voltage waveform $V_R$ and $V'_R$.

The waveforms shown in FIGURES 2b and 2c represent a control condition for the control circuit 15 with the arm 24 of the potentiometer $R_2$ in a high speed setting, such as is shown in FIGURE 1. As compared with the corresponding curves of FIGURES 3b and 3c, it will be seen that the reference signal $V_R$ reaches a higher level in each positive half cycle than the signal $V'_R$. Thus, the reference voltage $V_R$ early in the half cycle builds up to a point at time $t_1$ where voltage $V_R$ overcomes the counter-electromotive force of the motor represented by the voltage level CEMF and provides the requisite voltage at time $t_1$ for firing the controlled rectifier $SCR_1$. As will be seen from the voltage waveform $V_m$ shown in FIGURE 2c, power is supplied to the motor during the interval $t_1$–$t_3$ in each positive half cycle.

For the lower speed setting of the potentiometer arm 24, the waveforms of the capacitor voltage $V'_c$, the reference voltage $V'_R$ for each positive half cycle, and the voltage applied to the motor $V'_m$ are shown in FIGURES 3b and 3c. It will be seen that at time $t_2$ the reference voltage $V'_R$ rises to a level where it can overcome the counterelectromotive force CEMF′ of the motor 10 at the low speed and where the difference between the reference voltage $V'_R$ and the CEMF′ is sufficient to fire the controlled rectifier $SCR_1$. For this low speed setting, it will be seen that the controlled rectifier $SCR_1$ has a relatively shorter conduction period $t_2$–$t_3$ than for the high speed setting.

In FIGURE 3c I have shown the line voltage in dashed outline to provide a comparison for the applied motor voltage $V'_m$. It will be apparent that when the controlled rectifier $SCR_1$ fires late in each positive half cycle, less power is supplied to the motor 10. Consequently, the motor speed will be relatively lower.

It will be appreciated that the control circuit 15 is inherently regulating at both high and low speed levels. If the load applied to the motor 10 is increased and causes it to slow down, the counterelectromotive force of the motor 10 will decrease. As will be seen from the curves shown in FIGURES 2b and 2c, a lowering of the counterelectromotive force CEMF will cause the reference voltage $V_c$ to overcome the counterelectromotive force CEMF earlier in the half cycle. As a result, the controlled rectifier $SCR_1$ will be fired earlier in the half cycle thereby supplying increased power to the motor 10 to cause the speed of the motor 10 to increase. Conversely, when the load on the motor 10 is decreased, the motor 10 tends to increase in speed thereby increasing the counterelectromotive force CEMF. As the CEMF increases the controlled $SCR_1$ is triggered later in the half cycle to reduce the power supplied to the motor and thereby compensate for the decreased load.

An important advantage of the improved control circuit arrangement is that the cosinusodial ramp of the reference voltage provides a high feedback gain. Or stated in other words, a relatively small drop in the residual counter-electromotive force produces a relatively large change in the conduction time of the controlled rectifier $SCR_1$. By selection of a suitably large capacitor value for $C_1$, the cosine wave can be made quite flat (low in amplitude), hence providing a wider swing in firing angle for a small change in speed. As compared with speed control circuits employing a sinusoidal reference signal that is in phase with the line voltage, the improved arrangement makes it possible to fire the controlled rectifiers $SCR_1$ at firing angles greater than 90 degrees and thereby achieve a wider range of speed control, particularly at lower speed levels.

The circuit shown in FIGURE 1 was constructed to successfully control the speed of a fractional horsepower universal motor operated from a 120-volt, 60-cycle alternating supply. The following specifications of the principal circuit components are cited by way of a more specific exemplification of one form of the invention:

| | |
|---|---|
| Resistor $R_1$ | 3,300 ohms. |
| Potentiometer $R_2$ | 0–1,000 ohms. |
| Resistor $R_3$ | 1,000 ohms. |
| Capacitor $C_1$ | 250 microfarads, 20 volts (electrolytic). |
| Diodes $D_1$, $D_2$ | IN1693. |
| Capacitor $C_2$ | 10 microfarads (electrolytic). |
| Silicon controlled rectifier $SCR_1$ | General Electric C15B. |

Figure 4:
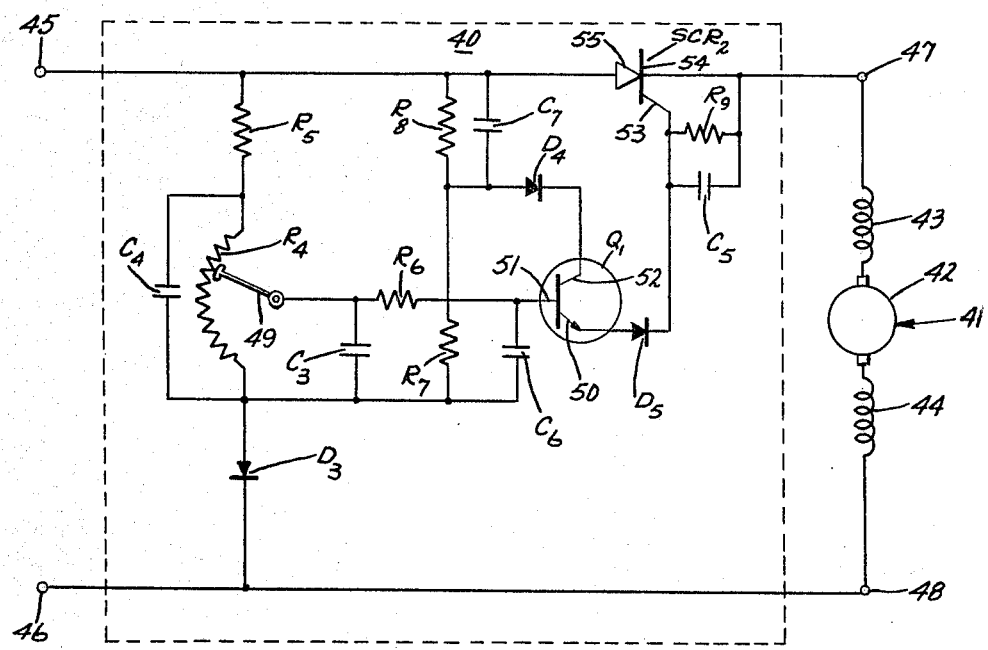
FIGURE 4 is a schematic circuit diagram of another form of the invention in which a transistor amplifier is employed to provide isolation and current gain between the reference signal and the controlled rectifier.

In FIGURE 4 I have illustrated another form of the improved controlled circuit in which a transistor stage is employed to provide isolation and current gain between the reference signal circuit and the gate of a controlled rectifier $SCR_2$. In its principal mode of the operation the speed contol circuit 40 shown in FIGURE 4 is essentially similar to the circuit of FIGURE 1. A cosinusoidal type of reference voltage signal riding on a D.C. voltage is compared with the residual counterelectromotive force of a motor 41 having an armature 42 and field windings 43 and 44. Input terminals 45 and 46 are adapted for connection to a suitable alternating source, such as a 120-volt, 60-cycle supply. A pair of control terminals 47 and 48 are provided for connection across the motor 41. When the motor 41 is connected across terminals 47, 48, it will be seen that the motor 41 is connected in series circuit relation with the controlled rectifier $SCR_2$.

The reference signal network includes a potentiometer $R_4$, a resistor $R_5$, capacitor $C_3$, diodes $D_3$, $D_4$ and the capacitors $C_3$ and $C_4$. Capacitors $C_4$ and $C_6$ serve to introduce additional phase displacement in the reference voltage so that it more closely approximates a true cosinusoidal waveform. The capacitor $C_3$ provides the desired integrating action on the voltage at the arm of the potentiometer $R_4$. The transistor amplifying stage includes a transistor $Q_1$ having an emitter 50, base 51 and collector 52, resistors $R_6$, $R_7$, $R_8$, capacitors $C_6$ and $C_7$, and the diode $D_4$. Diodes $D_3$, $D_4$, $D_5$ serve to isolate the integrating capacitor $C_3$ from the negative half cycle of the alternating current supply and protect transistor $Q_1$ and the gate of $SCR_2$ from excessive voltage during the negative half cycle. Resistors $R_7$, $R_8$ form a voltage divider which reduces the line voltage in order that the collector voltage rating of transistor $Q_1$ is not exceeded. Capacitor $C_7$ provides a voltage on the collector of $Q_1$ that leads the phase of the line voltage so that the controlled rectifier $SCR_2$ can be triggered early in the cycle when the reference signal calls for this. Without capacitor $C_7$ insufficient collector current may flow early in the cycle to trigger $SCR_2$ due to the low value of line voltage at short firing angles.

A parallel network including a resistor $R_9$ and capacitor $C_5$ preferably employed serves as a filter across the gate 53 and the cathode 54 of controlled rectifier $SCR_2$ to prevent misfirings and to some extent to stabilize the firing of the controlled rectifier $SCR_2$. The anode 55 of controlled rectifier $SCR_2$ is connected in circuit with terminal 45 so that the controlled rectifier $SCR_2$ is forward biased when polarity of the voltage across input terminals 45, 46 is such that the voltage at terminal 45 is positive with respect to terminal 46. It will be noted that the diodes $D_3$, $D_4$ and $D_5$ are poled so that they pass current during the same half cycle as the controlled rectifier $SCR_2$.

The control circuit 40 shown in FIGURE 4 controls the speed in essentially the same manner as the circuit shown in the FIGURE 1. During the positive half cycle of the alternating current supply, the reference voltage signal applied at the base 51 of transistor $Q_1$ is essentially a cosine wave displaced above the zero voltage level by the amount of the charge left on capacitor $C_3$ at the end of the negative half cycle. During the negative half cycle the capacitor $C_3$ is discharging. The D.C. signal level pedestal is adjusted by the potentiometer $R_4$ thereby providing a control of the speed of the motor 41. The ramp of the reference signal is essentially a cosine wave in each positive half cycle, and the potentiometer arm 49 can be adjusted to provide a reference signal that will overcome the opposing counterelectromotive force of the motor 41 at almost any time during the positive half cycle. With the control circuit 40 shown in FIGURE 4 it is possible to obtain still further improvements in the range of speed control at low speed levels and also to achieve further increases in the gain of the feedback loop without the hunting effects that could be encountered if the gate circuit of the controlled rectifier $SCR_2$ were to load down the reference signal circuit. In this circuit, transistor $Q_1$ prevents the gate circuit from loading down the reference signal network which includes the capacitors $C_3$, $C_4$, $C_6$ and resistors $R_4$, $R_6$.

The control circuit 40 shown in FIGURE 4 carries out the function of regulating the speed in essentially the same manner as the circuit illustrated in FIGURE 1. If during operation the motor 41 is loaded or if the load driven by the motor is increased, the speed of the motor 41 drops thereby causing a drop in the counterelectromotive force of the motor 41. This causes reference voltage signal to overcome the counterelectromotive force at an earlier point in the half cycle to fire the controlled rectifier $SCR_1$ thereby increasing the conduction period of the rectifier. In this manner additional power is supplied to the motor 41 to compensate for the increased By way of a more specific illustration of the form of the invention illustrated in FIGURE 4, the following specifications of the components used are given below: load.

| Component | Value |
|---|---|
| Controlled rectifier $SCR_2$ | General Electric C15B or C20B. |
| Potentiometer $R_4$ | 0–1,000 ohms. |
| Resistor $R_5$ | 2,200 ohms, 2 watts. |
| Resistor $R_6$ | 10,000 ohms. |
| Resistor $R_7$ | 220 ohms. |
| Resistor $R_8$ | 2,200 ohms, 2 watts. |
| Resistor $R_9$ | 1,000 ohms. |
| Diodes $D_3$, $D_5$ | IN1693. |
| Diode $D_4$ | IN1692. |
| Capacitor $C_3$ | 50 microfarads, 12 volts (electrolytic). |
| Capacitor $C_4$ | 2 microfarads, 100 volts. |
| Capacitor $C_5$ | 4 microfarads (electrolytic). |
| Capacitor $C_6$ | 0.5 microfarad. |
| Capacitor $C_7$ | 1 microfarad, 200 volts. |
| Transistor $Q_1$ | 2N2712. |

It will be understood that the component values and specific types of components which have been described herein are intended for illustrative purposes only. Further, from the foregoing description of the control circuits and their operation, many modifications will be apparent to those skilled in the art. It was found that these circuits make good controls for lamp dimmers, temperature regulators, and other resistive loads, and can be used in applications other than those which have been disclosed herein by way of exemplification of the invention. Also, it will be understood that the improved circuits may be adapted to full wave operation in applications where such control is desired. It is therefore intended by the appended claims to cover all such modifications and applications that fall within the true spirit and scope of the invention.

What I claim as new and desire to secure by Letters Patent of the United States is:

1. In a circuit for controlling the speed of an electric motor presenting a counterelectromotive force varying in magnitude with the motor speed, a pair of input terminals for connection to a source of alternating voltage, a pair of control terminals for connection to the motor, a solid state controlled rectifier having an anode, a cathode, and a gate control element, circuit means connecting said anode and cathode connected in series circuit relation with the control terminals and connecting said control terminals and said rectifier across said input terminals, the improvement comprising: a reference signal network for supplying a reference signal including a potentiometer having an adjustable control arm, a first rectifying element connected in series circuit with the potentiometer, an integrating capacitor connected across the control arm and one end of said potentiometer, and a second rectifying element connected in series circuit with the arm of said variable resistance element and the gate element of the controlled rectifier, and circuit means connecting said potentiometer and said first rectifying element across said input terminals, said first and second rectifying elements being poled to pass the same half cycle of the alternating source as the controlled rectifier, said reference voltage network providing a reference signal having essentially a cosinusoidal waveshape superimposed on a D.C. signal pedestal during the half cycle during which said rectifying elements are forwardly biased, and said controlled rectifier being fired when said reference signal overcomes the opposing counterelectromotive force of the motor presented at said control terminals to provide a current signal at the gate control element sufficient to fire the controlled rectifier.

2. The circuit set forth in claim 1 wherein a transistor amplifier network is connected in circuit between the output of the reference signal circuit and the gate control element to provide gain for the reference signal.

3. In a circuit for controlling the speed of a motor, said motor presenting at a pair of control terminals a counterelectromotive force substantially proportional to the speed of the motor, a pair of input terminals for connection to an alternating power source, a solid state controlled rectifier having an anode, cathode and a gate control element, said anode and cathode of said rectifier and said control terminals being connected in series circuit relation across the pair of input terminals, the improvement comprising: a fixed resistance element, a variable resistance element, a first rectifying element, a second rectifying element, a capacitor, said capacitor and said variable resistance element connected in parallel circuit relationship, circuit means connecting said parallel connected capacitor and variable resistance element in series circuit relation with said fixed resistance element and said first rectifying element across the pair of input terminals, said second rectifying element connected in circuit with said capacitor and the gate control element of said controlled rectifier, said first and second rectifying elements poled to conduct current during the positive half cycle of the alternating power source, said variable resistance element controlling the amount of charge left on said capacitor at the end of the negative half cycle of the alternating source to produce a reference voltage signal having a D.C. pedestal adjustable by said variable resistance element, and said capacitor when charged during the positive half cycle providing an essentially cosinusoidal ramp for the reference signal, and said controlled rectifier being fired in each positive half cycle when the reference signal exceeds the counterelectromotive force presented at the control terminals by an amount sufficient to provide the current required to fire the controlled rectifier.

4. In a circuit for controlling the speed of an electric motor having a serially connected armature and field winding, a pair of input terminals for connection to an alternating current source, a pair of control terminals for connection to the motor to be controlled, a solid state switching device switchable to a conducting state in response to an applied signal and turned off by the polarity reversal at the end of the half cycle of the alternating current source, and circuit means connecting the solid state switching device and the control terminals in series circuit relation across the input terminals, the improvement comprising: a voltage dividing means including a fixed resistance element and a variable resistance element, a first rectifying element, circuit means connecting said fixed resistance element, said variable resistance element and said first rectifying element in series relation across the input terminals; an integrating capacitor connected in parallel circuit relation with said variable resistance element to provide a reference signal having a D.C. voltage pedestal adjustable by said voltage dividing element, a second rectifying element, said first and second rectifying element being poled to conduct current during the same half cycle as the controlled rectifier, and circuit means connecting said second rectifying element in circuit with said integrating capacitor and the solid state switching device whereby said reference signal supplied to said second rectifying element is compared with the counterelectromotive force of the motor presented at one of the control terminals in order to trigger said switching device, said reference signal during each half cycle during which said capacitor is charged having an essentially cosinusoidal waveshape superimposed on a D.C. signal, and the speed of said motor being controlled by adjusting said variable resistance to change said D.C. signal.

5. A circuit for controlling the power supplied to a load, said circuit including a pair of control terminals for connection across the load, a pair of input terminals for connection to an alternating power source, a solid state controlled rectifier having an anode, a cathode and a gate control element, said anode and cathode of said rectifier and said control terminals being connected in series circuit relation across said pair of input terminals, the improvement comprising: a fixed resistance element, a variable resistance element, a first rectifying element, a second rectifying element, circuit means connecting said variable resistance element, said fixed resistance element and said first rectifying element in series circuit relation across the pair of input terminals, a capacitor connected in parallel circuit relation with said variable resistance element, said second rectifying element being connected in circuit with said capacitor and the gate control element of said controlled rectifier, said first and second rectifying elements and said controlled rectifier poled to conduct current during the positive half cycle of the alternating power source, said variable resistance element controlling the amount of charge left on said capacitor at the end of the negative half cycle of the alternating source to provide a reference signal having a D.C. voltage pedestal, said capacitor when charged during the positive half cycle producing an essentially cosinusoidal ramp for the reference signal, and said controlled rectifier being fired in each positive half cycle when the reference voltage signal exceeds the counter-electromotive force presented at the control terminals by an amount sufficient to provide the current required to fire the controlled rectifier.

References Cited by the Examiner

UNITED STATES PATENTS 3,018,432  1/1962  Palmer _____ 307—88.5

OTHER REFERENCES

Publication: Application Note 200.4 July 1961, "Universal Motor Speed Controls," F. W. Gutzwiller, June 1961, p. 7.

ORIS L. RADER, *Primary Examiner.*

JOHN F. COUCH, *Examiner.*

S. GORDON, J. C. BERENZWEIG, *Assistant Examiners.*